United States Patent
Kim et al.

(10) Patent No.: US 12,425,787 B2
(45) Date of Patent: Sep. 23, 2025

(54) ELECTRONIC APPARATUS FOR IDENTIFYING POSITION OF USER AND CONTROL METHOD THEREOF

(71) Applicant: SAMSUNG ELECTRONICS CO., LTD., Suwon-si (KR)

(72) Inventors: Jisoo Kim, Suwon-si (KR); Hyeontaek Lim, Suwon-si (KR); Boseok Moon, Suwon-si (KR); Sangdok Mo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 142 days.

(21) Appl. No.: 18/214,001

(22) Filed: Jun. 26, 2023

(65) Prior Publication Data

US 2024/0073637 A1    Feb. 29, 2024

Related U.S. Application Data

(63) Continuation of application No. PCT/KR2023/007283, filed on May 26, 2023.

(30) Foreign Application Priority Data

Aug. 23, 2022    (KR) .................... 10-2022-0105490

(51) Int. Cl.
  *H04R 5/00*   (2006.01)
  *H04S 7/00*   (2006.01)
  *H04R 3/00*   (2006.01)
(52) U.S. Cl.
  CPC ............. *H04S 7/00* (2013.01); *H04S 2400/11* (2013.01)
(58) Field of Classification Search
  CPC ........................... H04S 7/00; H04S 2400/11
  (Continued)

(56) References Cited

U.S. PATENT DOCUMENTS 9,424,841 B2   8/2016  Foerster et al.
10,966,022 B1  3/2021  Chu et al.
(Continued)

FOREIGN PATENT DOCUMENTS

CN    108962263 A    12/2018
CN    110047494 A    7/2019
(Continued)

OTHER PUBLICATIONS

International Search Report dated Sep. 15, 2023 issued by the International Searching Authority in International Application No. PCT/KR2023/007283 (PCT/ISA/210).
(Continued)

*Primary Examiner* — Ammar T Hamid
(74) *Attorney, Agent, or Firm* — Sughrue Mion, PLLC

(57) ABSTRACT

Provided is an electronic apparatus comprising a microphone, a communication interface, a memory, and at least one processor to control the electronic apparatus. The processor may execute at least one instruction stored in the memory to: based on a preset user voice of a user being received through the microphone, control the communication interface to request at least one first sound information from at least one home appliance, each of the at least one first sound information corresponding to the preset user voice received at each of the at least one home appliance, receive, through the communication interface, the at least one first sound information from the at least one home appliance, and identify a position of the user based on the preset user voice and the at least one first sound information.

20 Claims, 13 Drawing Sheets

(58) Field of Classification Search
USPC .................................................. 381/26, 111
See application file for complete search history.

(56) References Cited

U.S. PATENT DOCUMENTS

| | | | |
|---|---|---|---|
| 11,267,131 B2 | 3/2022 | Park et al. | |
| 11,455,833 B2 | 9/2022 | Yoon et al. | |
| 11,810,561 B2 | 11/2023 | Lee et al. | |
| 2020/0202114 A1 | 6/2020 | Yoon et al. | |
| 2020/0351586 A1 | 11/2020 | Fei et al. | |
| 2021/0383806 A1 | 12/2021 | Kim et al. | |
| 2022/0028377 A1 | 1/2022 | Shin et al. | |
| 2022/0101846 A1* | 3/2022 | Lee .......................... G01S 5/18 | |

FOREIGN PATENT DOCUMENTS

| | | |
|---|---|---|
| CN | 105929827 B | 3/2020 |
| CN | 116246619 A | 6/2023 |
| EP | 3 828 58 A1 | 6/2021 |
| JP | 2008-46956 A | 2/2008 |
| KR | 10-1919354 B1 | 11/2018 |
| KR | 10-2020-0076438 A | 6/2020 |
| KR | 10-2020-0076441 A | 6/2020 |
| KR | 10-2020-0101221 A | 8/2020 |
| KR | 10-2022-0034571 A | 3/2022 |
| KR | 10-2385263 B1 | 4/2022 |
| WO | 2021/187901 A1 | 9/2021 |

OTHER PUBLICATIONS

Written Opinion dated Sep. 15, 2023 issued by the International Searching Authority in International Application No. PCT/KR2023/007283 (PCT/ISA/237).

Han et al., "Sound Source Tracking Control of a Mobile Robot Using a Microphone Array," Journal of Institute of Control, Robotics and Systems, vol. 18, No. 4, pp. 343-352, 2012.

Wang et al., "Deep Face Recognition: A Survey," arXiv: 1804.06655v8 [cs.CV], Feb. 2019, Total 26 pages.

Person-detection-retail-0002, "Use Case and High-Level Description," https://docs.openvino.ai/2019_R1/person-detection-retail-0002.html, 2019, Total 3 pages.

Communication issued Jul. 25, 2025 by the European Patent Office in European Patent Application No. 23857486.7.

* cited by examiner

FIG. 8

| VALUE POSITION | DEVICE 1 (REFRIGERATOR) | DEVICE 2 (AIR CONDITIONER) | DEVICE 3 (AI SPEAKER) | DEVICE 4 (ETC.) |
|---|---|---|---|---|
| ROOM 5 | -0.001 | 0.005 | 0 | ... |
| ROOM 5 | -0.0011 | 0.0049 | 0 | ... |
| ROOM 1 | 0.0062 | 0 | -0.002 | ... |
| ROOM 1 | 0.006 | 0 | -0.0023 | ... |
| ROOM 2 | ... | ... | ... | INF (WHEN NO VOICE IS RECEIVED) |

MAX　　　　　　　　MIN

ELECTRONIC APPARATUS FOR IDENTIFYING POSITION OF USER AND CONTROL METHOD THEREOF

CROSS-REFERENCE TO RELATED APPLICATIONS

This application is a bypass continuation of PCT International Application No. PCT/KR2023/007283, which was filed on May 26, 2023, and claims priority to Korean Patent Application No. 10-2022-0105490, filed on Aug. 23, 2022, in the Korean Intellectual Property Office, the disclosures of which are incorporated by herein by reference in their entireties.

BACKGROUND

1. Field

The disclosure relates to an electronic apparatus and a control method thereof, and more specifically, to an electronic apparatus identifying a position of a user and a method for controlling the electronic apparatus.

2. Description of Related Art

Due to the development of electronic technology, various kinds of electronic apparatuses have been developed, such as an electronic apparatus equipped with a driver and capable of position movement has been developed (e.g., robot device). In this case, the electronic apparatus may move to a position of a user according to a user's call.

However, there is a problem in that the electronic apparatus does not identify the position of the user accurately due to the surrounding environment.

Furthermore, there is a demand for restricting the movement of the robot device under a certain condition in a privacy zone or space having a high risk of privacy violation, while the robot device moves through a plurality of spaces in a house to perform a function.

SUMMARY

According to an aspect of the disclosure, an electronic apparatus includes: a microphone; a communication interface; a memory storing at least one instruction; and at least one processor connected to the microphone and the communication interface. The at least one processor is configured to execute the at least one instruction to: based on a preset user voice of a user being received through the microphone, control the communication interface to request at least one first sound information from at least one home appliance, each of the at least on first sound information corresponding to the preset user voice received at each of the at least one home appliance, receive, through the communication interface, the at least one first sound information from the at least one home appliance, and identify a position of the user based on the preset user voice and the at least one first sound information.

The processor may be further configured to execute the at least one instruction to: based on the preset user voice being received through the microphone, control the communication interface to transmit time information indicating when the preset user voice is received to the at least one home appliance, and receive, through the communication interface, the at least one first sound information corresponding to the time information from the at least one home appliance.

The memory may be further configured to store a position information of the at least one home appliance, and the processor may be further configured to execute the at least one instruction to identify the position of the user based on the position information, the preset user voice, and the at least one first sound information.

The electronic apparatus may further include: a speaker, where the processor may be further configured to execute the at least one instruction to: output an inaudible sound through the speaker based on a preset event occurring, receive, through the communication interface, at least one second sound information corresponding to the inaudible sound from the at least one home appliance, and identify a position of the at least one home appliance based on a position of the electronic apparatus outputting the inaudible sound and the at least one second sound information.

The electronic apparatus may further include: a driver, where the processor may be further configured to execute the at least one instruction to: control the driver to move the electronic apparatus to each of a plurality of positions, output the inaudible sound through the speaker at each of the plurality of positions, and identify the position of the at least one home appliance based on the plurality of positions and the at least one second sound information received at each of the plurality of positions.

The preset event may include at least one of an event of initializing the electronic apparatus and an event having no response to a request for the at least one first sound information.

The memory may be configured to store latency information of the at least one home appliance in each of a plurality of regions, and the processor may be further configured to execute the at least one instruction to: identify latency information of each of the at least one first sound information, and identify the position of the user based on the identified latency information and the latency information stored in the memory.

The electronic apparatus may further include: a driver, where the processor may be further configured to execute the at least one instruction to control the driver to move the electronic apparatus to the position of the user.

The electronic apparatus may further include: a camera, where the processor may be further configured to execute the at least one instruction to: capture an image through the camera based on the electronic apparatus moving to the position of the user, and identify the user based on the image.

The memory may be configured to store user information in which face information of each of a plurality of users and voice information of each of the plurality of users are mapped, and the processor may be further configured to execute the at least one instruction to: obtain face information corresponding to the preset user voice based on the user information, and identify the user corresponding to the face information from the image.

The electronic apparatus may further include: a speaker, where the processor may be further configured to execute the at least one instruction to output the preset sound through the speaker based on the face information corresponding to the preset user voice not being obtained based on the user information, or based on the user corresponding to the face information not being identified from the image.

According to an aspect of the disclosure, a method of controlling an electronic apparatus, includes: receiving a preset user voice of a user; requesting at least one first sound information from at least one home appliance, each of the at least one first sound information corresponding to the preset user voice received at each of the at least one home appliance; receiving the at least one first sound information from the at least one home appliance; and identifying a position of the user based on the preset user voice and the at least one first sound information.

The requesting the at least one first sound information may include: transmitting time information about when the preset user voice is received to the at least one home appliance, based on the preset user voice being received, where the at least one first sound information received from the at least on home appliance corresponds to the time information.

The identifying the position of the user may include: identifying position information of the at least one home appliance by calculating latency information of each of the at least one first sound information received from the at least one home appliance, and identifying the position of the user based on the position information of the at least one home appliance.

The identifying the position of the user may include: identifying the position of the user based on a position information of the at least one home appliance, the preset user voice, and the at least one first sound information.

The identifying the position information of the at least one home appliance may include: outputting an inaudible sound based on a preset event occurring; receiving at least one second sound information corresponding to the inaudible sound from the at least one home appliance; and identifying a position of the at least one home appliance based on a position of the electronic apparatus outputting the inaudible sound and the at least one second sound information.

The method may further include: controlling the electronic apparatus to move to each of a plurality of positions; outputting the inaudible sound at each of the plurality of positions; and identifying the position of the at least one home appliance based on the plurality of positions and the at least one second sound information received at each of the plurality of positions.

The method may further include: controlling the electronic apparatus to move to the position of the user.

The method may further include: capturing an image at the position of the user, based on the electronic apparatus moving to the position of the user; and identifying the user based on the image and face information corresponding to the preset user voice.

According to an aspect of the disclosure, a non-transitory computer readable medium stores computer readable program code or instructions which are executable by a processor to perform a method of controlling an electronic apparatus. The method includes: receiving a preset user voice of a user; requesting at least one first sound information from at least one home appliance, each of the at least one first sound information corresponding to the preset user voice received at each of the at least one home appliance; receiving the at least one first sound information from the at least one home appliance; and identifying a position of the user based on the preset user voice and the at least one first sound information.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6-9 are diagrams illustrating a method of identifying a position of a user without using a position of at least one home appliance according to one or more embodiments;

DETAILED DESCRIPTION

Figure 1:
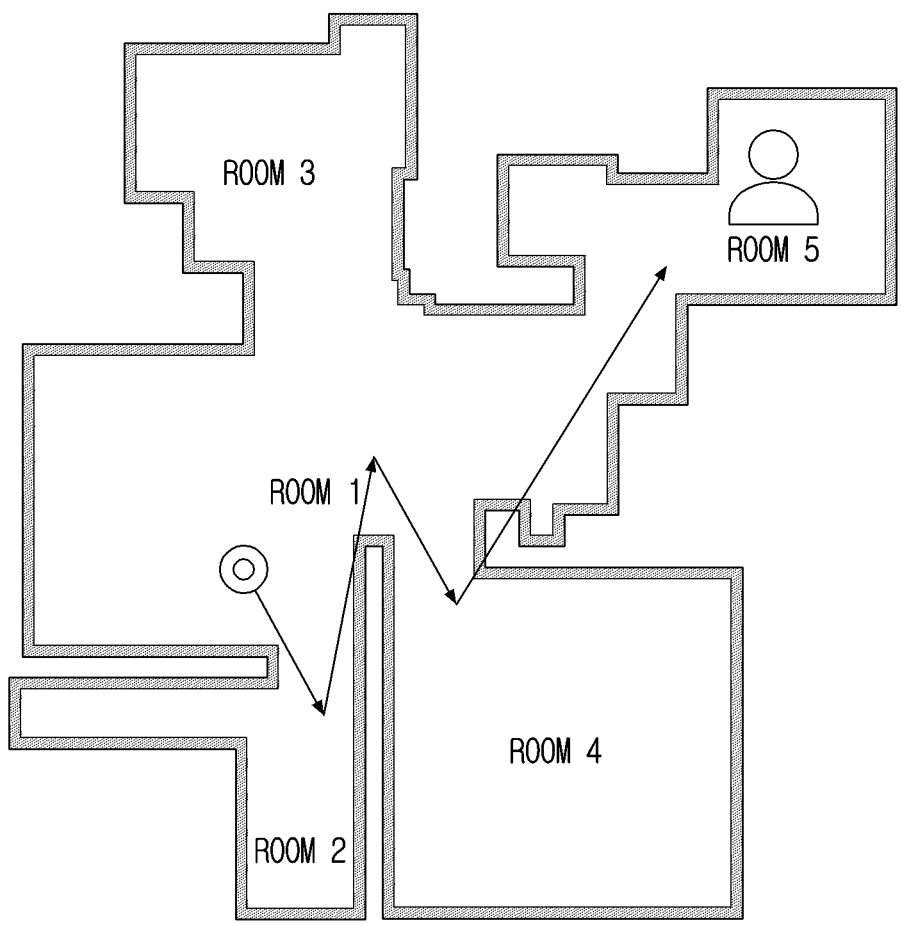
FIG. 1 is a diagram illustrating a movement operation of a device according to a user's call according to one or more embodiments.

The example embodiments of the present disclosure may be diversely modified. Accordingly, specific example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail.

The disclosure provides an electronic apparatus identifying the position of a user according to a user's call and a control method thereof.

Although general terms used in the embodiments of the disclosure are selected to describe embodiments in consideration of the functions thereof, these general terms may vary according to intentions of one of ordinary skill in the art, legal or technical interpretation, the advent of new technologies, etc. Some terms are arbitrarily selected by the applicant of the embodiments. In this case, the meaning will be described in detail in the description of the disclosure. Accordingly, the terms used in the disclosure should be defined based on the meaning of the term, not on the name of a simple term, but on the entire contents of the disclosure.

In this specification, the expressions "have", "may have", "include" and "comprise", or "may include" and "may comprise" used herein indicate existence of corresponding features (e.g., elements such as numeric values, functions, operations, or components) but do not exclude presence of additional features.

The expression at least one of A or B should be understood to denote either "A" or "B" or "A and B".

The terms such as "first", "second", and the like used herein may refer to various elements regardless of the order and/or priority of the elements and may be used to distinguish an element from another element, not to limit the elements.

The singular forms "a", "an" and "the" include plural forms unless the context clearly dictates otherwise. In the present application, the terms "include" or "configure" etc., specify the presence of a feature, a number, a step, an operation, an element, a component, or a combination thereof but do not preclude the presence or addition of one or more features, numbers, steps, operations, components, parts, or combinations thereof.

In this specification, the term user may refer to a person using an electronic apparatus or an apparatus (e.g., an artificial intelligence electronic apparatus) using an electronic apparatus.

Hereinafter, various example embodiments of the disclosure will be described with reference to the accompanying drawings, where similar reference characters denote corresponding features consistently throughout.

FIG. 1 is a diagram illustrating a movement operation of a device according to a user's call according to one or more embodiments.

The device may move to the position of a user according to the user's call indoors. However, in some cases, due to noise, obstacles, reflection, absorption, etc., the device may not accurately identify the position of the user. In particular, when the device does not identify the position of the user, the device may need to search for spaces sequentially as shown in FIG. 1.

In order to improve this, the device may include a plurality of microphones to more accurately identify the position of the user, but in this case, the manufacturing cost of the device may increase.

Figure 2:
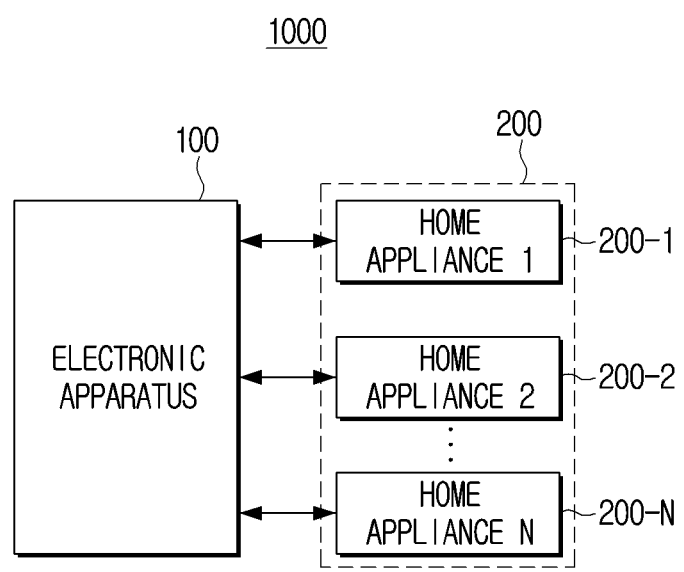
FIG. 2 is a block diagram illustrating a configuration of an electronic system according to one or more embodiments.

FIG. 2 is a block diagram illustrating a configuration of an electronic system 1000 according to one or more embodiments. As shown in FIG. 2, the electronic system 1000 includes an electronic apparatus 100 and a plurality of home appliances 200-1 to 200-N. However, the electronic system 1000 is not limited thereto, and may include only the electronic apparatus 100 and one home appliance. Hereinafter, the plurality of home appliances 200-1 to 200-N will be described as at least one home appliance 200 for convenience of description.

The electronic apparatus 100 is an apparatus identifying the position of a user, and may be a movable device such as a robot vacuum cleaner. However, the electronic apparatus 100 is not limited thereto, and may be an apparatus implemented as a computer mainframe, a set-top box (STB), an AI speaker, a TV, a desktop PC, a laptop, a smartphone, a tablet PC, smart glasses, a smart watch, etc. to identify the position of the user, and provide information about the position of the user as a mobile device such as a robot vacuum cleaner, and any device capable of identifying the position of the user may be used.

When a user's preset user voice is received, the electronic apparatus 100 may request sound information corresponding to the user's voice from the at least one home appliance 200, and identify the position of the user based on the preset user voice and the sound information received from at least one home appliance 200. According to an embodiment, the electronic apparatus 100 may previously store position information of the at least one home appliance 200 and identify the position of the user based on the position information, the preset user voice, and the sound information.

The at least one home appliance 200 is an apparatus receiving the user voice and transmitting the sound information corresponding to the user voice to the electronic apparatus 100, and may be a computer mainframe, a STB, an AI speaker, a TV, a desktop PC, a laptop, a smartphone, a tablet PC, smart glasses, a smart watch, a refrigerator, washing machine, an air conditioner, etc. However, the at least one home appliance 200 is not limited thereto, and any apparatus capable of receiving the user voice through a microphone and transmitting the sound information corresponding to the user voice to the electronic apparatus 100 through a communication interface may be used.

The at least one home appliance 200 may transmit the sound information to the electronic apparatus 100 when receiving the user's preset user voice and receiving a request for the sound information corresponding to the user voice from the electronic apparatus 100.

Figure 3:
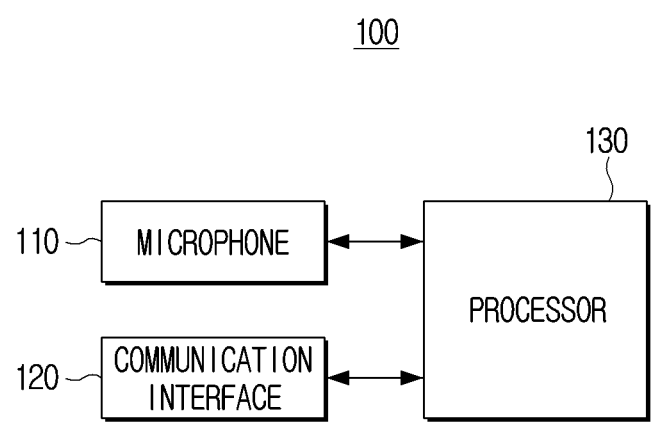
FIG. 3 is a block diagram illustrating a configuration of an electronic apparatus according to one or more embodiments.

FIG. 3 is a block diagram illustrating a configuration of the electronic apparatus 100 according to one or more embodiments.

As shown in FIG. 3, the electronic apparatus 100 includes a microphone 110, a communication interface 120 and a processor 130.

The microphone 110 is a component for receiving sound and converting the sound into an audio signal. The microphone 110 may be electrically connected to the processor 130 and receive the sound by the control of the processor 130.

For example, the microphone 110 may be formed integrally with an upper side of the electronic apparatus 100, a front direction, or a side direction. According to an embodiment, the microphone 110 may be provided in a separate remote controller from the electronic apparatus 100. In this case, the remote controller may receive sound through the microphone 110 and provide the received sound to the electronic apparatus 100.

The microphone 110 may include various configurations such as a microphone collecting analog sound, an amplifier circuit amplifying the collected sound, an A/D conversion circuit sampling the amplified sound and converting the sound into a digital signal, a filter circuit removing a noise component from the converted digital signal, etc.

According to an embodiment, the microphone 110 may be implemented in the form of a sound sensor, and any component capable of collecting sound may be used.

The communication interface 120 is a component performing communication with various types of external apparatuses according to various types of communication methods. For example, the electronic apparatus 100 may communicate with the at least one home appliance 200 through the communication interface 120.

The communication interface 120 may include a Wi-Fi module, a Bluetooth module, an infrared communication module, a wireless communication module, etc. According to an embodiment, each communication module may be implemented in the form of at least one hardware chip.

The Wi-Fi module and the Bluetooth module perform communication using a WiFi method and a Bluetooth method, respectively. When the Wi-Fi module or the Bluetooth module is used, the electronic apparatus 100 may first transmit and receive various types of connection information such as an SSID, a session key, etc., connect communication using the connection information, and then transmit and receive various types of information. The infrared communication module performs communication according to infrared data association (IrDA) technology of transmitting data wirelessly over a short distance using infrared rays between visible rays and millimeter waves.

In addition to the communication method described above, the wireless communication module may include at least one communication chip that performs communication according to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), etc.

According to an embodiment, the communication interface 120 may include a wired communication interface such as HDMI, DP, Thunderbolt, USB, RGB, D-SUB, DVI, etc.

According to an embodiment, the communication interface 120 may include at least one of a local area network (LAN) module, an Ethernet module, or a wired communication module that performs communication using a pair cable, a coaxial cable, or an optical fiber cable.

The processor 130 generally controls the operation of the electronic apparatus 100. Specifically, the processor 130 may be connected to each component of the electronic apparatus 100 to control the overall operation of the electronic apparatus 100. For example, the processor 130 may be connected to components such as the microphone 110, the communication interface 120, a memory (e.g., memory 140), and a display (e.g., display 170) to control the operation of the electronic apparatus 100.

According to one or more embodiments, the processor 130 may be implemented as a digital signal processor (DSP), a microprocessor, or a time controller (TCON). However, the processor 130 is not limited thereto, and may include one or more of a central processing unit (CPU), a micro controller unit (MCU), a micro processing unit (MPU), a controller, an application processor (AP), a communication processor (CP) or an ARM processor, or may be defined as the corresponding term. According to an embodiment, the processor 130 may be implemented as a system on chip (SoC) with a processing algorithm embedded or a large scale integration (LSI), or may be implemented as a field programmable gate array (FPGA).

The processor 130 may be implemented as one processor or as a plurality of processors. However, hereinafter, for convenience of explanation, the operation of the electronic apparatus 100 will be described using the expression of the processor 130.

When receiving the user's preset user voice through the microphone 110, the processor 130 may control the communication interface 120 to request at least one first sound information corresponding to the received user's preset user voice from the at least one home appliance 200. For example, when receiving a user voice "Robot, come here!", the processor 130 may control the communication interface 120 to request at least one first sound information corresponding to the received "Robot, come here!" from the at least one home appliance 200.

The processor 130 may receive the at least one first sound information from the at least one home appliance 200 through the communication interface 120, and identify the position of the user based on the preset user voice and the at least one first sound information. A method of identifying the position of the user may be a rule-based method or a method using a neural network model. A detailed description in this regard will be described below through the drawings.

When receiving the preset user voice through the microphone 110, the processor 130 may control the communication interface 120 to transmit time information about when the preset user voice is received to the at least one home appliance 200, and may receive the at least one first sound information corresponding to the time information from the at least one home appliance 200 through the communication interface 120. For example, when receiving the user voice "Robot, come here!", the processor 130 may control the communication interface 120 to transmit 15:00 at which the user voice "Robot, come here!" is received to the at least one home appliance 200, and may receive the at least one first sound information after 15:00 from the at least one home appliance 200 through the communication interface 120. Through this operation, an unnecessary time period in the first sound information except for the preset user voice may be reduced.

According to an embodiment, when receiving the preset user voice through the microphone 110, the processor 130 may control the communication interface 120 to transmit time information about when the preset user voice is received and the duration of the preset user voice to the at least one home appliance 200 and receive the at least one first sound information corresponding to the time information and the duration from the at least one home appliance 200 through the communication interface 120.

The electronic apparatus 100 may further include a memory (e.g., memory 140) in which position information of the at least one home appliance is stored, and the processor 130 may identify the positon of the user based on the position information, the preset user voice, and the at least one first sound information. Accordingly, the processor 130 may identify the position of the user in the same manner as microphones are disposed at a plurality of positions.

The electronic apparatus 100 may further include a speaker (e.g., speaker 150), and the processor 130 may output an inaudible sound through the speaker when a preset event occurs, receive at least one second sound information corresponding to the inaudible sound from the at least one home appliance 200 through the communication interface 120, and identify the position of the at least one home appliance 200 based on the position of the electronic apparatus 100 that outputs the inaudible sound and the at least one second sound information.

According to an embodiment, the preset event may include at least one of an event of initializing the electronic apparatus 100 and an event having no response to the request for the at least one first sound information. That is, when the electronic apparatus 100 is disposed in a new place, the processor 130 may identify the position of the at least one home appliance 200 in the same manner as above. According to an embodiment, when there is no response to the request for the at least one first sound information, the processor 130 may identify that the position of the existing home appliance has changed, and identify the position of the at least one home appliance 200 in the same manner as above. According to an embodiment, the processor 130 may obtain information about a space where the electronic apparatus 100 is disposed while identifying the position of the at least one home appliance 200 in the same manner as above. That is, the processor 130 may obtain information about the space where the electronic apparatus 100 is disposed and the position of the at least one home appliance 200 in the space as a map. According to an embodiment, the space where the electronic apparatus 100 is disposed may include all spaces in which the electronic apparatus 100 is movable.

In the above, the state in which the electronic apparatus 100 previously stores the position information of the at least one home appliance 200 has been described. However, the disclosure is not limited thereto, and the processor 130 may identify the position of the user without the position information of the at least one home appliance 200. For example, the electronic apparatus 100 may further include a memory storing latency information of at least one home appliance in each of a plurality of regions, and the processor 130 may identify latency information of each of the at least one first sound information, and identify the position of the user based on the identified latency information and the latency information stored in the memory.

The electronic apparatus 100 may further include a driver (e.g., driver 160), and the processor 130 may control the driver to move the electronic apparatus 100 to each of a plurality of positions, output an inaudible sound through the speaker at each of the plurality of positions, and identify the positon of the at least one home appliance 200 based on the plurality of positions and the at least one second sound information received from each of the plurality of positions.

According to an embodiment, the processor 130 may control the driver to move the electronic apparatus 100 to the position of the user.

The electronic apparatus 100 may further include a camera (e.g., camera 190), and when the electronic apparatus 100 moves to the position of the user, the processor 130 may capture an image through the camera and identify the user based on the image.

For example, the electronic apparatus 100 may further include a memory (e.g., memory 140) storing user information in which face information of each of a plurality of users and voice information of each of the plurality of users are mapped, and the processor 130 may obtain face information corresponding to the preset user based on the user information, and identify a user corresponding to the face information from the image. According to an embodiment, the processor 130 may identify the user from the image through a neural network model.

According to an embodiment, the processor 130 may output a preset sound through the speaker when the face information corresponding to the preset user voice is not obtained based on the user information, or the user corresponding to the face information is not identified from the image. For example, when the face information corresponding to the preset user voice is not obtained based on the user information, or the user corresponding to the face information is not identified from the image, the processor 130 may output a sound such as "Who called?" through the speaker.

According to an embodiment, a function related to artificial intelligence (AI) according to the disclosure may be performed by the processor 130 and a memory.

The processor 130 may include one processor or a plurality of processors, such as a general-purpose processor, such as a CPU, an application processor (AP), a digital signal processor (DSP), etc., a graphic-dedicated processor, such as a GPU, a vision processing unit (VPU), etc., or an AI-dedicated processor, such as a neural processing unit (NPU).

The processor 130 may process input data according to a predefined operation rule or an AI model stored in the memory. According to an embodiment, when the processor 130 includes an AI-dedicated processor, the AI-dedicated processor may be designed to have a hardware structure specialized for processing a specific AI model. The predefined operation rule or the AI model may be made through training.

Herein, when the AI model is made through training, it may mean that a basic AI model is trained based on a learning algorithm by using multiple training datasets, such that the predefined operation rule or AI model set to execute desired characteristics (or purpose) is made. Such learning may be performed by a device on which AI according to the disclosure is implemented, or by a separate server and/or system. Examples of a learning algorithm may include, but not limited to, supervised learning, unsupervised learning, semi-supervised learning, or reinforcement learning.

The AI model may include a plurality of neural network layers. Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be updated to reduce or minimize a loss value or a cost value obtained in the AI model during a training process.

Examples of the AI neural network may include, but not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), a generative adversarial network (GAN), or a deep Q-network.

Figure 4:
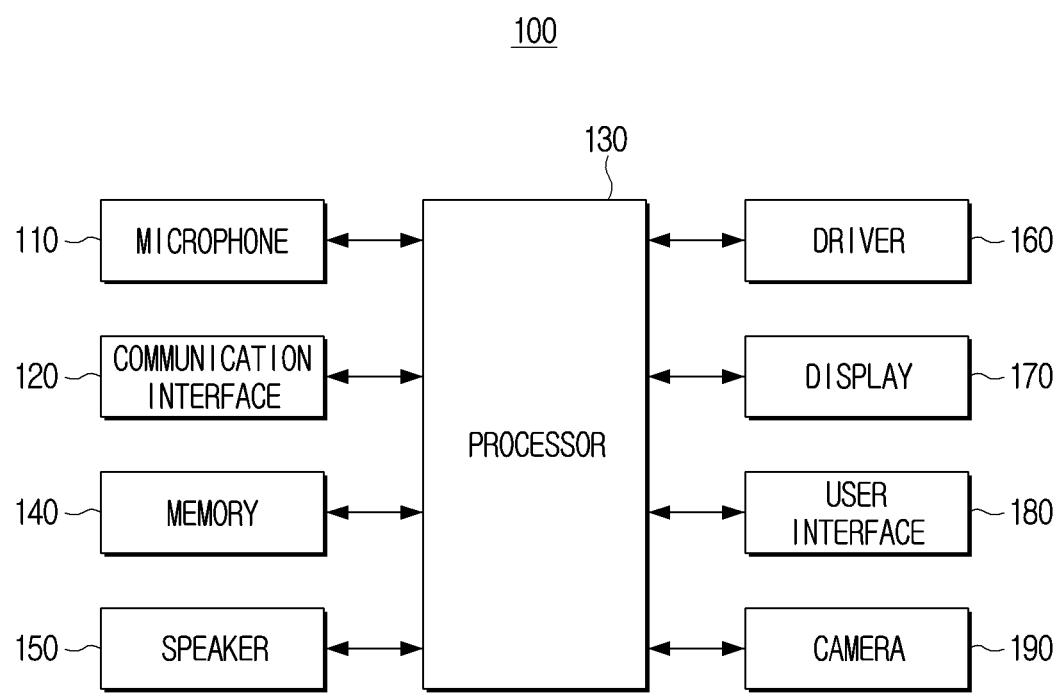
FIG. 4 is a block diagram illustrating a detailed configuration of an electronic apparatus according to one or more embodiments.

FIG. 4 is a block diagram illustrating a detailed configuration of the electronic apparatus 100 according to one or more embodiments.

The electronic apparatus 100 may include the microphone 110, the communication interface 120, and the processor 130. Also, according to FIG. 4, the electronic apparatus 100 may further include a memory 140, a speaker 150, a driver 160, a display 170, a user interface 180, and a camera 190. Among the components shown in FIG. 4, detailed descriptions of the redundant components with those shown in FIG. 3 are omitted.

The memory 140 may refer to hardware that stores information such as data in an electrical or magnetic form so that the processor 130 or the like may access the information. To this end, the memory 140 may be implemented as at least one hardware among non-volatile memory, volatile memory, flash memory, hard disk drive (HDD), solid state drive (SSD), RAM, ROM, etc.

At least one instruction necessary for the operation of the electronic apparatus 100 or the processor 130 may be stored in the memory 140. According to an embodiment, the instruction is a code unit instructing the operation of the electronic apparatus 100 or the processor 130, and may be written in machine language, which is a language understandable by a computer. According to an embodiment, a plurality of instructions for performing a specific task of the electronic apparatus 100 or the processor 130 may be stored in the memory 140 as an instruction set.

The memory 140 may store data that is information in units of bits or bytes capable of representing characters, numbers, images, etc. For example, map information, user information, and a neural network model may be stored in the memory 140.

The memory 140 may be accessed by the processor 130, and the instruction, the instruction set, or the data may be read/recorded/modified/deleted/updated by the processor 130.

The speaker 150 is a component that outputs not only various audio data processed by the processor 130 but also various notification sounds or voice messages.

The driver 160 is a component moving the electronic apparatus 100 and may include, for example, at least one wheel and a motor driving the wheel. However, the driver 160 is not limited thereto, and may include legs for a four-legged walk and a motor driving the legs, and any component capable of moving the electronic apparatus 100 may be used.

The display 170 is a component that displays an image and may be implemented as various types of displays such as a liquid crystal display (LCD), an organic light emitting diodes (OLED) display, a plasma display panel (PDP), etc. The display 170 may also include a driving circuit, a backlight unit, etc. that may be implemented in the form of an a-si TFT, a low temperature poly silicon (LTPS) TFT, or an organic TFT (OTFT). According to an embodiment, the display 170 may be implemented as a touch screen combined with a touch sensor, a flexible display, a 3D display, etc.

The user interface 180 may be implemented as buttons, a touch pad, a mouse, a keyboard, etc., or may be implemented as a touch screen capable of performing both a display function and a manipulation input function. According to an embodiment, the buttons may be various types of buttons such as mechanical buttons, a touch pad, a wheel, etc. formed on an arbitrary region such as the front, side, or rear portion of the appearance of the main body of the electronic apparatus 100.

The camera 190 is a component capturing a still image or a moving image. The camera 190 may capture a still image at a specific time point, but may also continuously capture still images.

The camera 190 may capture a real environment in front of the electronic apparatus 100 by capturing the front of the electronic apparatus 100. The processor 130 may identify a user from an image captured by the camera 190.

The camera 190 includes a lens, a shutter, an aperture, a solid-state imaging device, an analog front end (AFE), and a timing generator (TG). The shutter adjusts the time taken for light reflected from a subject to enter the camera 190, and the aperture adjusts the amount of light incident on the lens by mechanically increasing or decreasing the size of an opening through which light enters. When the light reflected from the subject is accumulated as photocharges, the solid-state imaging device outputs an image generated by the photocharges as an electrical signal. The TG outputs a timing signal for reading out pixel data of the solid-state imaging device, and the AFE samples and digitizes the electrical signal output from the solid-state imaging device.

As described above, the electronic apparatus 100 may more accurately identify the position of the user by using at least one home appliance as a microphone, and identify the user who uttered a preset use voice based on the face information and voice information of the user, even if there are a plurality of users.

Hereinafter, the operation of the electronic apparatus 100 will be described in more detail with reference to FIGS. 5-12. FIGS. 5-12 describe individual embodiments for convenience of description. However, the individual embodiments of FIGS. 5-12 may be implemented in any combination.

Figure 5:
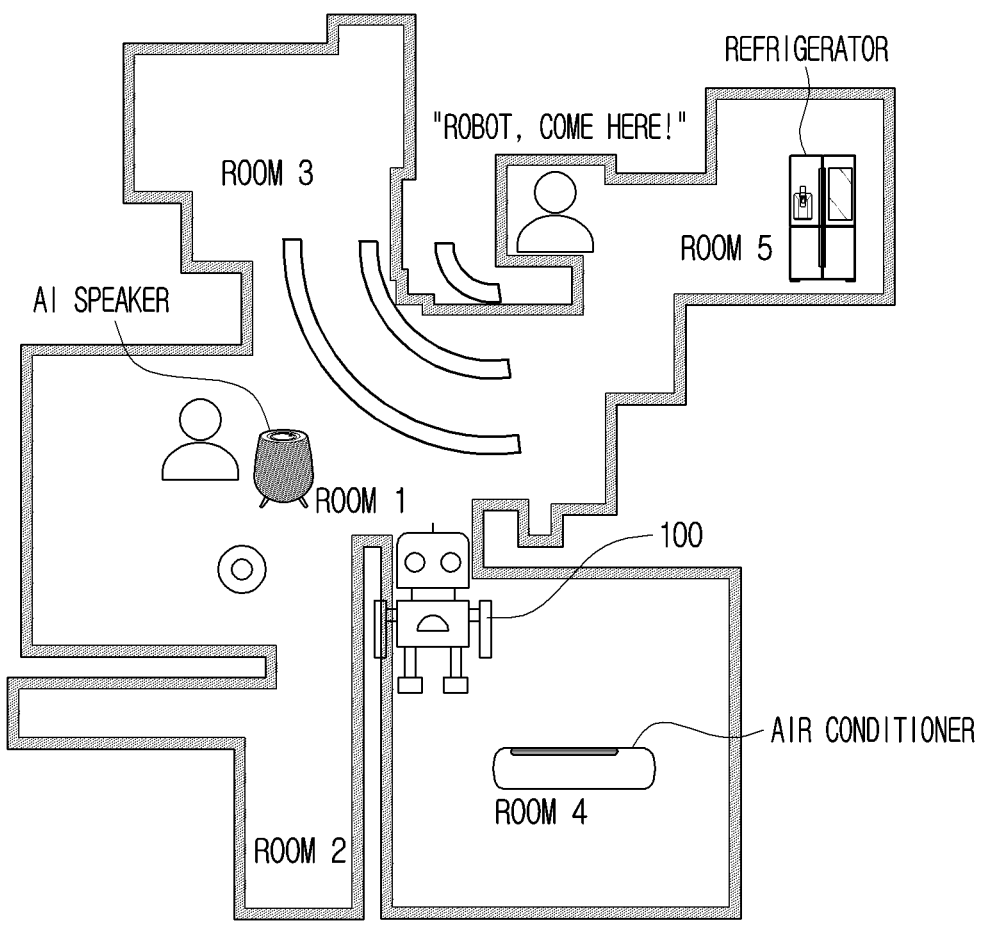
FIG. 5 is a diagram illustrating a multi-channel microphone environment according to one or more embodiments.

FIG. 5 is a diagram illustrating a multi-channel microphone environment according to one or more embodiments. In FIG. 5, for convenience of description, the electronic apparatus 100 is illustrated as a robot.

As shown in FIG. 5, the electronic apparatus 100 may communicate with an AI speaker, a refrigerator, or an air conditioner. Also, the electronic apparatus 100 may be in a state in which information about a space in which the electronic apparatus 100 is disposed and position information of each of the AI speaker, the refrigerator, and the air conditioner is previously stored.

When receiving a user voice "Robot, come here!", the electronic apparatus 100 may request first sound information corresponding to the preset user voice from each of the AI speaker, the refrigerator, and the air conditioner, and receive the first sound information from each of the AI speaker, the refrigerator, and the air conditioner. According to an embodiment, the first sound information may be information corresponding to a preset user voice received by each of the AI speaker, the refrigerator, and the air conditioner. According to an embodiment, since the AI speaker, the refrigerator, and the air conditioner are all disposed in different positions, the first sound information of the AI speaker, the first sound information of the refrigerator, and the first sound information of the air conditioner may all be different.

The electronic apparatus 100 may identify the position of the user based on the position information of each of the AI speaker, the refrigerator, and the air conditioner, the preset user voice received by the electronic apparatus 100, and the first sound information received from each of the AI speaker, the refrigerator, and the air conditioner.

As described above, even if the electronic apparatus 100 includes only one microphone 110, the multi-channel microphone environment may be established by using the at least one home appliance 200 as a microphone, and the position of the user may be more accurately identified.

FIGS. 6-9 are diagrams illustrating a method of identifying a position of a user without using a position of the at least one home appliance 200 according to one or more embodiments.

Figure 6:
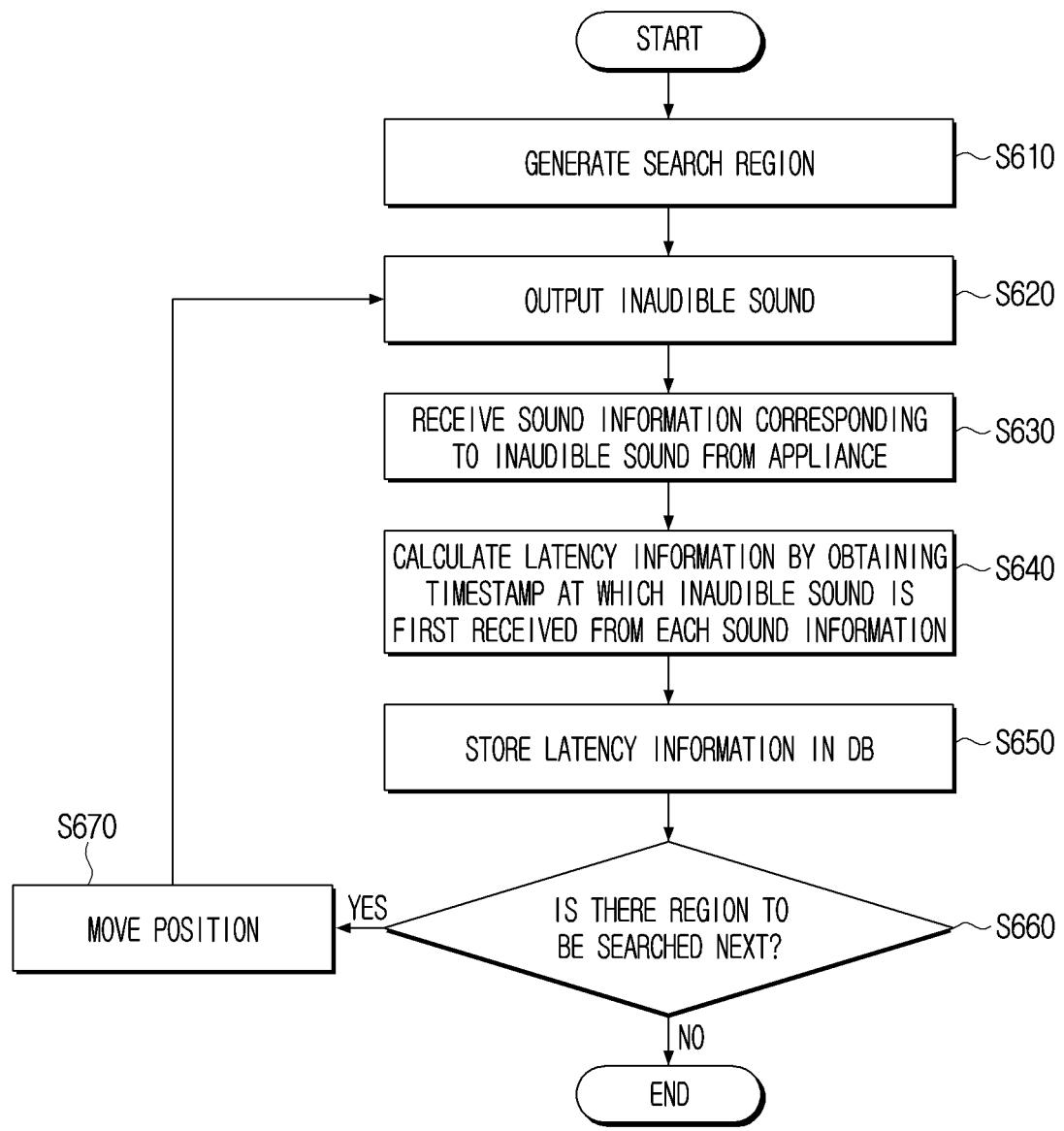
Figure 7:
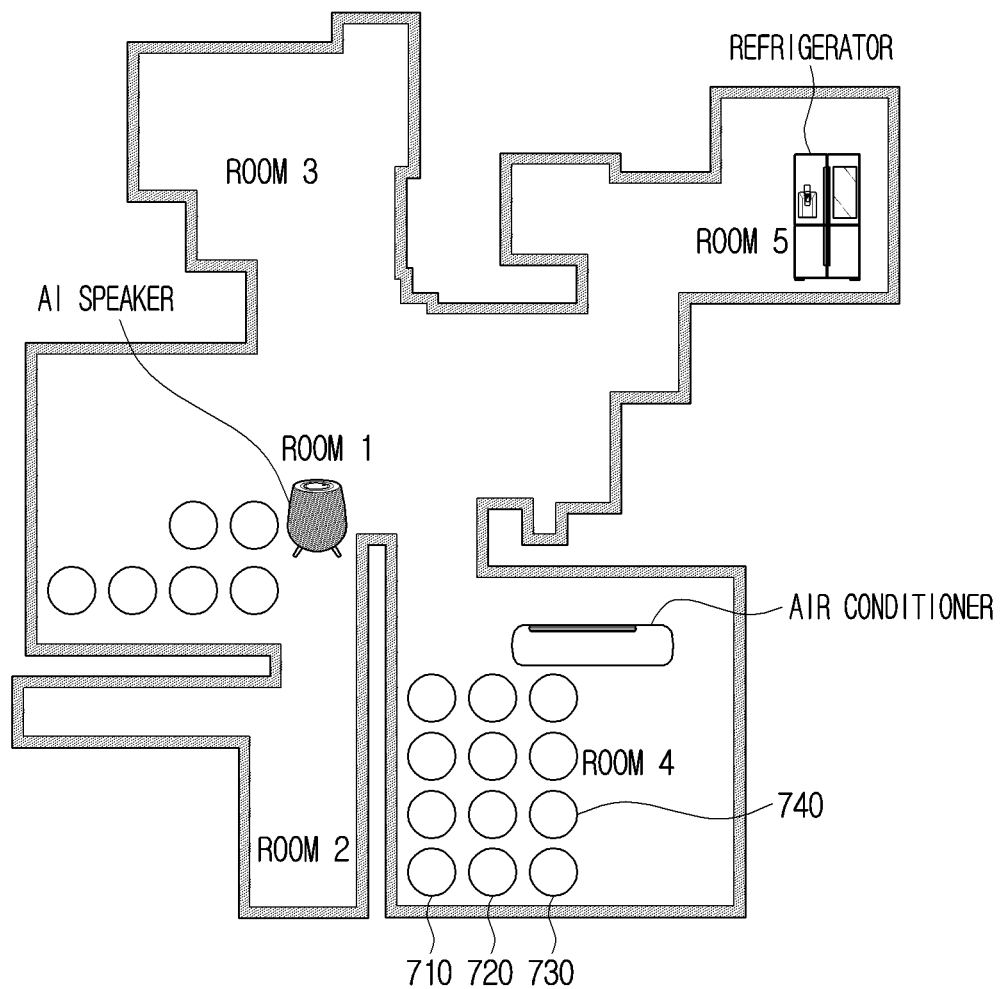

Referring to FIG. 6, at operation S610, the processor 130 may generate a search region. For example, as shown in FIG. 7, the electronic apparatus 100 may be a robot vacuum cleaner, and the processor 130 may move the electronic apparatus 100 to a next position and generate the region where a search is to be performed. The processor 130 may determine the next position based on a current position of the electronic apparatus 100 and a diameter of the electronic apparatus 100. For example, the processor 130 may move the electronic apparatus 100 as much as the diameter of the electronic apparatus 100. In some cases, the next position may be the same as the current position, and the processor 130 may determine that the electronic apparatus 100 is moved to the next position without activating the driver 160. The processor 130 may move the electronic apparatus 100 to a plurality of positions, and at each position the processor 130 may perform one or more operations of FIG. 6 to be described below. As shown in FIG. 7, the processor 130 may sequentially move the electronic apparatus 100 to each of position 710, position 720, position 730, and position 740, etc. The processor 130 may perform one or more operations of FIG. 6 at position 710, then perform the same operation(s) at position 720, and sequentially perform the same operation(s) at position 730, position 740, etc.

At operation S620, the processor 130 may output an inaudible sound, and at operation S630 the processor 130 may receive sound information corresponding to the inaudible sound from the at least one home appliance 200. At operation S640, the processor 130 may calculate latency information by obtaining a timestamp at which the inaudible sound is first received from each sound information, and at operation S650, the processor 130 may store the latency information in a database. According to an embodiment, the latency information may be obtained based on a plurality of timestamps obtained from a plurality of sound information received from the at least one home appliance 200.

For example, the processor 130 may receive sound information from an air conditioner, and sound information from a refrigerator. The processor 130 may identify timestamp 0.2 s at which the inaudible sound is first received based on the sound information from the air conditioner, and identify timestamp 0.4 s at which the inaudible sound is first received based on the sound information from the refrigerator. The processor 130 may identify a timestamp for each sound information received from a home appliance of the at least one home appliance 200, and obtain a median value. For example, assuming only the above-mentioned air conditioner and refrigerator, the median value is 0.3 s, and the processor 130 may calculate (each timestamp-median value) and store the median value in the database.

At operation S660, the processor 130 may identify whether there is a region to be searched next. If it is identified that there is the region to be searched next, then at operation S670, the processor 130 may move the electronic device 100 to a location corresponding to the region to be searched next, and the processor 130 may return to operation S620.

As shown in FIG. 8, the database may include the timestamp-median value of each of a plurality of home appliances at each position.

However, the disclosure is not limited thereto, and the processor 130 may use an average value instead of the median value. According to an embodiment, the processor 130 may determine a next position to be at a distance other than the diameter of the electronic apparatus 100, and the processor 130 may move the electronic apparatus 100 to the next position at such distance.

When the database is established as described above, the processor 130 may identify the position of the user even if there is no position information of the at least one home appliance 200, which will be described with reference to FIG. 9.

Figure 9:
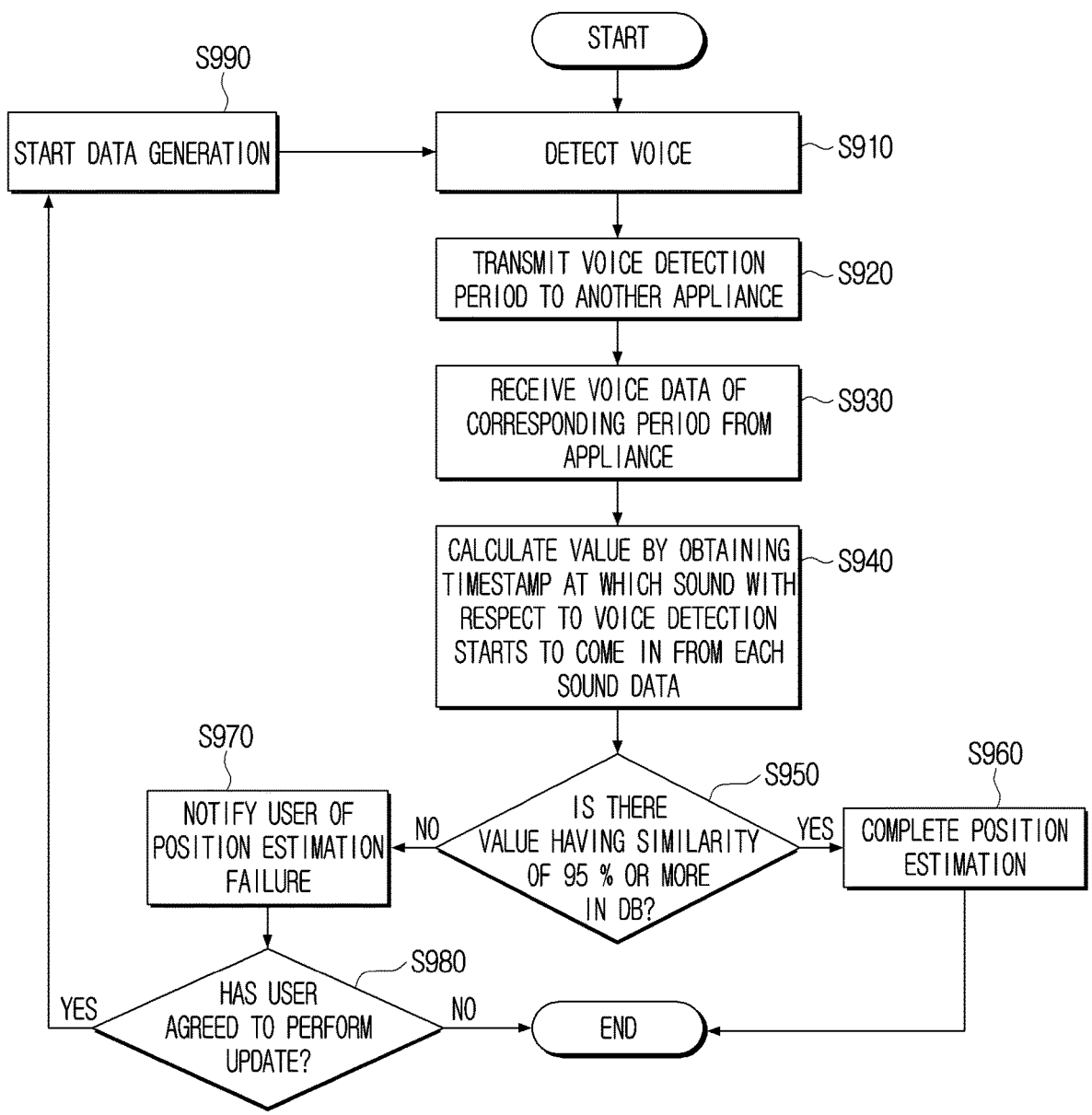

Referring to FIG. 9, at operation S910, the processor 130 may detect a voice (e.g., receive a preset user voice), and at operation S920, the processor 130 may transmit a voice detection period (e.g., timestamp) of the preset user voice to another appliance (e.g., at least one home appliance 200). According to an embodiment, the voice detection period may include a reception time of the preset user voice. According to an embodiment, the voice detection period may include the reception time of the preset user voice and a duration of the preset user voice.

At operation S930, the processor 130 may receive voice data (sound information) corresponding to the voice detection period from the at least one home appliance 200. At operation S940, the processor 130 may calculate latency information by obtaining a timestamp at which sound with respect to the voice detection is first received from each sound information. According to an embodiment, the latency information may be obtained in the same way as described in FIG. 6.

At operation S950, the processor 130 may identify whether the latency information has a value having a similarity of 95% or more to information included in the database (DB). If the latency information has a value having a similarity of 95% or more, then at operation S960, the processor 130 may complete position estimation. According to an embodiment, the similarity threshold of 95% is only an example, and various values may be used for the similarity threshold (e.g., 99%, 85%, 50%, etc.).

If the latency information does not include a value having a similarity of 95% or more, then at operation S970, the processor 130 may identify that the position estimation has failed, and provide a notification of the position estimation failure to the user.

The processor 130 may identify whether the user agrees to perform an update, and may start data generation if the user agrees. According to an embodiment, the data generation means the operation of FIG. 7.

The processor 130 may identify the position information of the user based on the sound information obtained in each search region through the above method.

Figure 10:
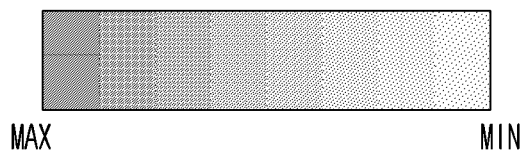
FIGS. 10-12 are diagrams illustrating a method of identifying a position of a user using a position of at least one home appliance according to one or more embodiments.
Figure 11:
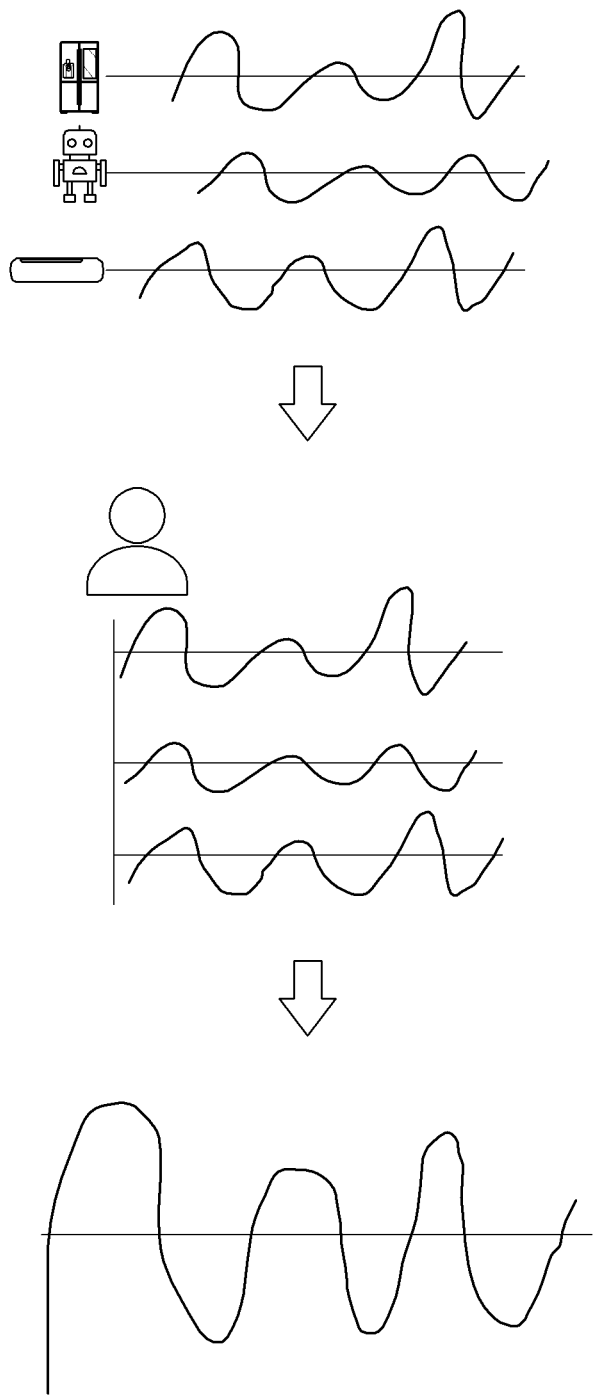
Figure 12:
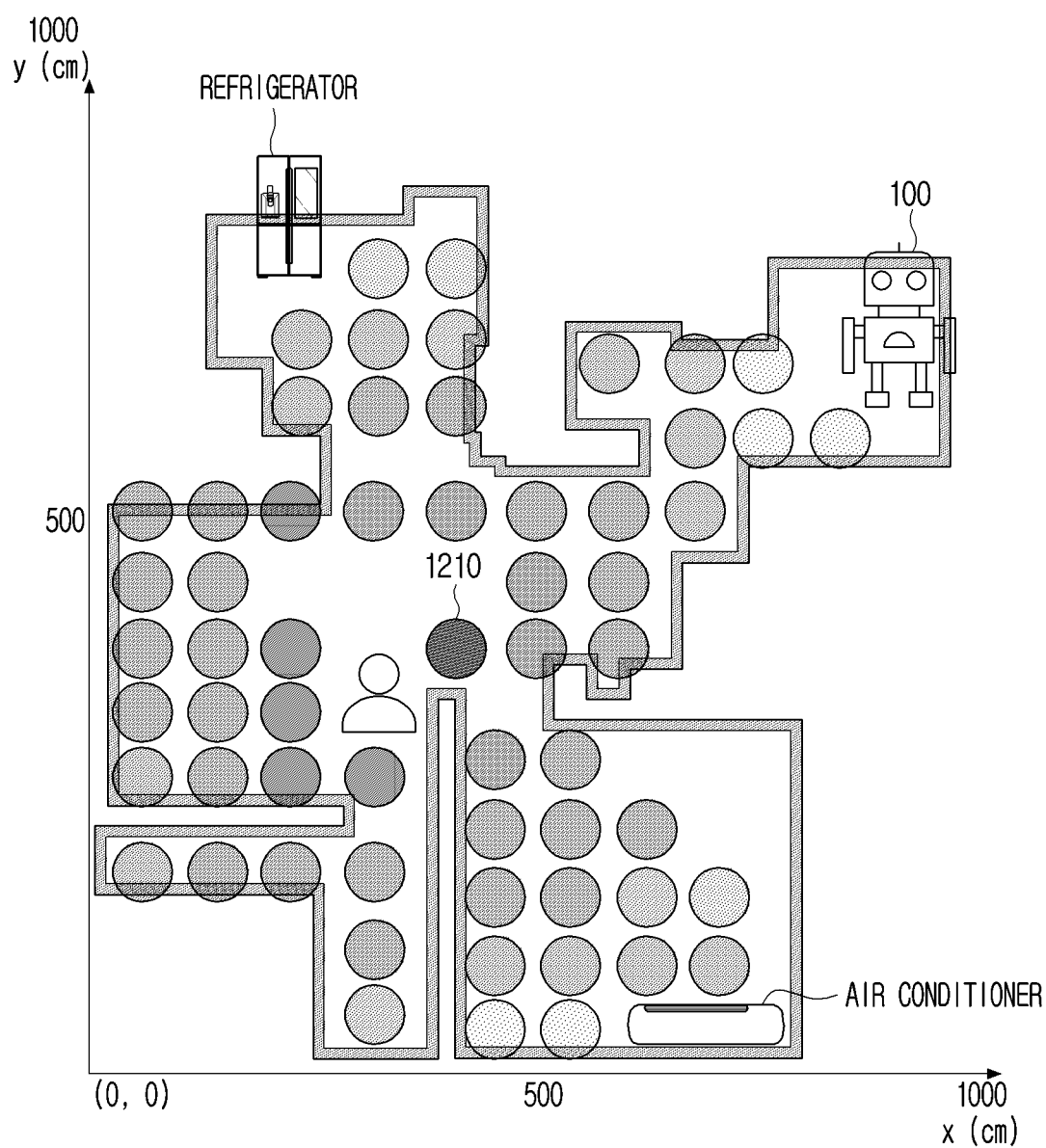

FIGS. 10-12 are diagrams illustrating a method of identifying a position of a user using a position of the at least one home appliance 200 according to one or more embodiments.

The processor 130 may obtain a power value according to each position in order to identify the position of the user based on the position of the at least one home appliance 200, the preset user voice, and the at least one first sound information received from the at least one home appliance 200. For example, the power value may be obtained as a value between a maximum value and a minimum value as shown in FIG. 10, and each of a plurality of positions may be associated with a power value between the maximum value and the minimum value as shown in FIG. 12.

Referring to FIG. 12, the processor 130 may identify a space where the electronic apparatus 100 is disposed as a plurality of circular areas. Also, the processor 130 may obtain the power value based on the position of the at least one home appliance 200 for each region, the preset user voice, and the at least one first sound information.

Referring to FIG. 11, the processor 130 may shift each of the at least one first sound information based on latency information of the first sound information, obtain a waveform by matching the shifted first sound information and the preset user voice, and obtain the power value based on the waveform.

For example, the processor 130 may obtain the power value for each region using steered-response power phase transform (SRP-PHAT). The SRP-PHAT method has robust performance for estimating a distant sound source, and may divide a space into a plurality of grids and calculate each steered-response power (SRP) value by the following formula.

$$P(\Delta_1 \ldots \Delta_M) = \sum_{l=1}^{M} \sum_{q=1}^{M} \int_{-\infty}^{\infty} \frac{1}{|X_l(w) X_q^J(w)|} X_l(w) X_q^J(w) e^{jw(\Delta_q - \Delta_l)} dw$$

The processor 130 may identify a largest power value from a plurality of SRP values calculated for each of a plurality of regions by the following formula, and identify the position of the user based on the largest power value among the plurality of SRP values.

$$P(\tau) \equiv \underset{\tau}{\mathrm{argmax}}(P(\Delta_1 \ldots \Delta_M))$$

For example, as shown in FIG. 12, the power value for each region may be expressed, and a region having the largest power value (e.g., position 1210) may be identified as the position of the user.

Figure 13:
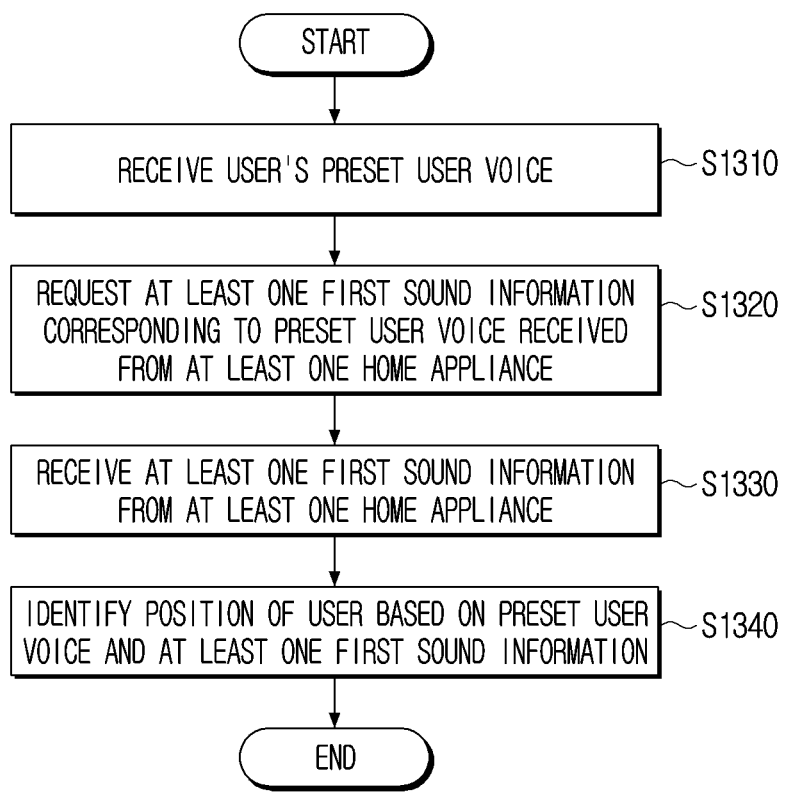
FIG. 13 is a flowchart illustrating a control method of an electronic apparatus according to one or more embodiments.

FIG. 13 is a flowchart illustrating a control method of an electronic apparatus according to one or more embodiments.

Referring to FIG. 13, at operation S1310, a user's preset user voice is received. At operation S1320, at least one first sound information corresponding to the preset user voice being received is requested from at least one home appliance. At operation S1330, the at least one first sound information is received from the at least one home appliance. At operation S1340, the position of the user is identified based on the preset user voice and the at least one first sound information.

According to an embodiment, at operation S1320, when the preset user voice is received, time information about when the preset user voice is received may be transmitted to the at least one home appliance, and in operation S1330, the at least one first sound information received from the at least one home appliance corresponds to the time information.

According to an embodiment, at operation S1340, the position of the user may be identified based on position information of the at least one home appliance, the preset user's voice, and the at least one first sound information.

According to an embodiment, the method may further include, when a preset event occurs, an operation of outputting an inaudible sound, an operation of receiving at least one second sound information corresponding to the inaudible sound from the at least one home appliance, and an operation of identifying the position of the at least one home appliance based on the position of the electronic apparatus outputting the inaudible sound and the at least one second sound information corresponding to the inaudible sound.

According to an embodiment, the method may further include an operation of moving the electronic apparatus to each of a plurality of positions. In the outputting operation, the inaudible sound may be output at each of the plurality of positions. In the operation of identifying the position of the at least one home appliance, the position of the at least one home appliance may be identified based on the plurality of positions and the at least one second sound information received at each of the plurality of positions.

According to an embodiment, the preset event may include at least one of an event of initializing the electronic apparatus and an event having no response to a request for the at least one first sound information.

According to an embodiment, the method may further include an operation of identifying latency information of each of the at least one first sound information. In the identifying operation, at S1340, the position of the user may be identified based on the identified latency information and previously stored latency information.

According to an embodiment, the method may further include an operation of moving the electronic apparatus to the position of the user.

According to an embodiment, the method may further include an operation of capturing an image and identifying the user based on the image when the electronic apparatus moves to the position of the user.

According to an embodiment, the method may further include an operation of obtaining face information corresponding to the preset user voice based on user information in which face information of each of a plurality of users and voice information of each of the plurality of users are mapped. In the operation of identifying the user, the user corresponding to the face information may be identified from the image.

According to an embodiment, the method may further include an operation of outputting a preset sound when the face information corresponding to the preset user voice is not obtained based on the user information or when the user corresponding to the face information is not identified from the image.

According to various embodiments of the disclosure as described above, the electronic apparatus may more accurately identify the position of the user by using at least one home appliance as a microphone.

According to an embodiment, the electronic apparatus may identify the user who uttered the preset user voice based on the face information and voice information of the user even if there are a plurality of users.

The various embodiments described above may be implemented as software including instructions stored in a machine (e.g., a computer)-readable storage medium. The machine is a device capable of calling a stored command from a storage medium and operating according to the called command, and may include an electronic apparatus (e.g., an electronic apparatus A) according to the disclosed embodiments. When a command is executed by a processor, the processor may perform a function corresponding to the command directly or by using other components under the control of the processor. The command may include code generated or executed by a compiler or interpreter. The machine-readable storage media may be provided in the form of non-transitory storage media. Here, 'non-temporary' means that the storage media do not include a signal and is tangible, but do not distinguish whether data is stored semi-permanently or temporarily on the storage media.

The method according to various embodiments described above may be provided in a computer program product. The computer program product may be traded between a seller and a purchaser as a commodity. The computer program product may include a product in the form of a machine-readable storage medium (e.g., compact disc read only memory (CD-ROM)) or may be online distributed through an application store (e.g., Google Play Store™ or AppStore™). In case of electronic distribution, at least a part of the computer program product may be at least temporarily stored or created on a storage medium such as memory of a server of a manufacturer, a server of an application store, or a relay server.

The various embodiments described above may be implemented in a recording medium readable by a computer or a similar device using software, hardware, or a combination thereof. In some cases, the embodiments described herein may be implemented in a processor itself. According to software implementation, the embodiments such as procedures and functions described herein may be implemented as separate software. Each software may perform one or more functions and operations described herein.

The computer instructions for performing a processing operation of the device according to various embodiments described above may be stored in a non-transitory computer-readable medium. The computer instructions stored in such a non-transitory computer-readable medium, when executed by a processor of a specific device, cause a specific device to perform a processing operation in the device according to various embodiments described above. The non-transitory computer-readable medium is not a medium that stores data for a short moment, such as a register, cache, or memory but is a medium that stores data semi-permanently and is readable by a device. Specific examples of the non-transitory computer-readable medium may include CD, DVD, hard disk, Blu-ray disk, USB, memory card, ROM, etc.

Each component (for example, a module or a program) according to various embodiments described above may be composed of a singular entity or a plurality of entities, and some of the above-described subcomponents may be omitted, or other subcomponents may be further included in various embodiments. Alternatively or additionally, some components (e.g., modules or programs) may be integrated into one entity to perform a function performed by each corresponding component prior to integration in the same or similar manner. Operations performed by a module, program, or other component according to various embodiments may be performed sequentially, in parallel, repeatedly, or heuristically, or at least some operations may be performed in a different order, omitted, or another operation may be added.

While certain example embodiments of the disclosure have been illustrated and described above, embodiments of the disclosure is not limited to the above-described specific embodiments, and may be variously modified by those skilled in the pertinent art without departing from the gist of the disclosure as claimed in the claims and their equivalents, and such modifications should not be individually understood from the technical idea or the prospect of the disclosure.

What is claimed is:

1. An electronic apparatus comprising:
a microphone;
a communication interface;
a memory storing at least one instruction; and
at least one processor connected to the microphone and the communication interface, and configured to execute the at least one instruction to:
based on a preset user voice of a user being received through the microphone, control the communication interface to request at least one first sound information from at least one home appliance, each of the at least one first sound information corresponding to the preset user voice received at each of the least one home appliance,
receive, through the communication interface, the at least one first sound information from the at least one home appliance, and
identify a position of the user based on the preset user voice and the at least one first sound information.

2. The electronic apparatus of claim 1, wherein the processor is further configured to execute the at least one instruction to:
based on the preset user voice being received through the microphone, control the communication interface to transmit time information indicating when the preset user voice is received to the at least one home appliance, and
receive, through the communication interface, the at least one first sound information corresponding to the time information from the at least one home appliance.

3. The electronic apparatus of claim 1, wherein the memory is further configured to store a position information of the at least one home appliance, and
wherein the processor is further configured to execute the at least one instruction to identify the position of the user based on the position information, the preset user voice, and the at least one first sound information.

4. The electronic apparatus of claim 3, further comprising:
a speaker,
wherein the processor is further configured to execute the at least one instruction to:
output an inaudible sound through the speaker based on a preset event occurring,
receive, through the communication interface, at least one second sound information corresponding to the inaudible sound from the at least one home appliance, and
identify a position of the at least one home appliance based on a position of the electronic apparatus outputting the inaudible sound and the at least one second sound information.

5. The electronic apparatus of claim 4, further comprising:
a driver,
wherein the processor is further configured to execute the at least one instruction to:
control the driver to move the electronic apparatus to each of a plurality of positions,
output the inaudible sound through the speaker at each of the plurality of positions, and
identify the position of the at least one home appliance based on the plurality of positions and the at least one second sound information received at each of the plurality of positions.

6. The electronic apparatus of claim 4, wherein the preset event comprises at least one of an event of initializing the electronic apparatus and an event having no response to a request for the at least one first sound information.

7. The electronic apparatus of claim 1, wherein the memory is configured to store latency information of the at least one home appliance in each of a plurality of regions, and
wherein the processor is further configured to execute the at least one instruction to:
identify latency information of each of the at least one first sound information, and
identify the position of the user based on the identified latency information and the latency information stored in the memory.

8. The electronic apparatus of claim 1, further comprising:
a driver,
wherein the processor is further configured to execute the at least one instruction to control the driver to move the electronic apparatus to the position of the user.

9. The electronic apparatus of claim 8, further comprising:
a camera,
wherein the processor is further configured to execute the at least one instruction to:
based on the electronic apparatus moving to the position of the user, capture an image through the camera, and
identify the user based on the image.

10. The electronic apparatus of claim 9, wherein the memory is further configured to store user information in which face information of each of a plurality of users and voice information of each of the plurality of users are mapped, and
wherein the processor is further configured to execute the at least one instruction to:
obtain face information corresponding to the preset user voice based on the user information, and
identify the user corresponding to the face information from the image.

11. The electronic apparatus of claim 10, further comprising:
a speaker,
wherein the processor is further configured to execute the at least one instruction to output the preset sound through the speaker based on the face information corresponding to the preset user voice not being obtained based on the user information, or based on the user corresponding to the face information not being identified from the image.

12. A method of controlling an electronic apparatus, comprising:
receiving a preset user voice of a user;
requesting at least one first sound information from at least one home appliance, each of the at least one first sound information corresponding to the preset user voice received at each of the at least one home appliance;
receiving the at least one first sound information from the at least one home appliance; and
identifying a position of the user based on the preset user voice and the at least one first sound information.

13. The method of claim 12, wherein the requesting the at least one first sound information comprises:
based on the preset user voice being received, transmitting time information about when the preset user voice is received to the at least one home appliance, and wherein the at least one first sound information received from the at least on home appliance corresponds to the time information.

14. The method of claim 13, wherein the identifying the position of the user comprises:
identifying position information of the at least one home appliance by determining latency information of each of the at least one first sound information received from each of the at least one home appliance, and
identifying the position of the user based on the position information of the at least one home appliance.

15. The method of claim 12, wherein the identifying the position of the user comprises:
identifying the position of the user based on a position information of the at least one home appliance, the preset user voice, and the at least one first sound information.

16. The method of claim 14, wherein the identifying the position information of the at least one home appliance comprises:
outputting an inaudible sound based on a preset event occurring;
receiving at least one second sound information corresponding to the inaudible sound from the at least one home appliance; and
identifying a position of the at least one home appliance based on a position of the electronic apparatus outputting the inaudible sound and the at least one second sound information.

17. The method of claim 16, further comprising:
controlling the electronic apparatus to move to each of a plurality of positions;
outputting the inaudible sound at each of the plurality of positions; and
identifying the position of the at least one home appliance based on the plurality of positions and the at least one second sound information received at each of the plurality of positions.

18. The method of claim 12, further comprising:
controlling the electronic apparatus to move to the position of the user.

19. The method of claim 12, further comprising:
capturing an image at the position of the user, based on the electronic apparatus moving to the position of the user; and
identifying the user based on the image and face information corresponding to the preset user voice.

20. A non-transitory computer readable medium for storing computer readable program code or instructions which are executable by a processor to perform a method of controlling an electronic apparatus, the method comprising:
receiving a preset user voice of a user;
requesting at least one first sound information from at least one home appliance, each of the at least one first sound information corresponding to the preset user voice received at each of the at least one home appliance;
receiving the at least one first sound information from the at least one home appliance; and
identifying a position of the user based on the preset user voice and the at least one first sound information.

* * * * *